United States Patent
Kwak

[19]

[11] Patent Number: 6,133,959
[45] Date of Patent: Oct. 17, 2000

[54] DEVICE AND METHOD FOR DETECTING SYNC SIGNAL FROM DIGITAL TV SIGNAL

[75] Inventor: Heung Sik Kwak, Seoul, Rep. of Korea

[73] Assignee: LG Electronics Inc., Seoul, Rep. of Korea

[21] Appl. No.: 09/002,024

[22] Filed: Dec. 31, 1997

[30] Foreign Application Priority Data

Dec. 31, 1996 [KR] Rep. of Korea ............... 79283/96

[51] Int. Cl.[7] .................................................. H04N 5/08
[52] U.S. Cl. .................. 348/525; 348/845.3; 375/368; 375/365
[58] Field of Search ............................. 348/500, 525, 348/423, 845, 845.1, 845.3, 526, 528, 529, 530, 531; 375/366, 365, 368, 364; 370/514, 513; H04N 5/08

[56] References Cited

U.S. PATENT DOCUMENTS

| | | | |
|---|---|---|---|
| 5,014,416 | 1/2000 | Shin et al. | 375/368 |
| 5,596,582 | 1/1997 | Sato et al. | 375/368 |
| 5,949,834 | 9/1999 | Laud et al. | 375/368 |
| 5,960,048 | 9/1999 | Haartsen | 375/366 |

*Primary Examiner*—Michael H. Lee

[57] ABSTRACT

Method and device for detecting a synchronizing signal from a digital T.V. signal is disclosed. An initial value is stored as a maximum value in each of memories arranged to match to symbols consisting a datastream of the digital T.V. signal. A comparator has a symbol pattern stored therein in advance, which is identical to a symbol pattern of an actual synchronizing signal contained in the digital T.V. signal. Upon reception of the datastreams of the digital T.V. signal, the comparator compares the symbol pattern stored therein already to the symbols in the received datastream in sequence, to provide zero signals if identical and minus values if not identical. An adder adds a signal from the comparator and an initial value stored in a corresponding memory among the memories and stores in the corresponding memory, to update the initial value in each memory. A synchronizing signal detector compares each of the updated initial values to a reference value, for providing the updated initial value as the synchronizing signal when the updated initial value is equal or greater than the reference value. The reference value is set on the basis of the initial value, and can prevent erroneous detection of the synchronizing signal because the reference signal is always higher than any noise signal, such as ghost.

32 Claims, 4 Drawing Sheets

DEVICE AND METHOD FOR DETECTING SYNC SIGNAL FROM DIGITAL TV SIGNAL

BACKGROUND OF THE INVENTION

1. Field of the Invention

The present invention relates to device and method for detecting a synchronizing signal from a digital TV signal.

2. Description of the Related Art

In general, the digital television broadcasting system adopted by the ATSC(Advanced Television Systems Committee) of the U.S. employs terrestrial VSB (Vestigial Side Band) transmission system, in which video data and the synchronizing signal are transmitted separately. And, an exact position of the synchronizing signal should be detected from the video data at a receiver side. Because the synchronizing signal distinguishes between preset intervals of the video data, detection of the exact position of the synchronizing signal is very important. In other words, because the synchronizing signal is a reference timing for processing signals by various parts in the receiver, the exact detection of the synchronizing signal at a reception terminal of the video data has very important. In general, for this synchronizing signal detection at the receiver side, a synchronizing signal pattern is inserted in the video data.

As shown in FIG. 1 which illustrates a general VSB transmission data, the VSB transmission system uses a data stream (or a bit stream) having a particular periodic synchronizing signal pattern inserted thereto for easy detection of the synchronizing signal therefrom in a digital television receiver. The data stream has a succession of data segments of 832 symbols each with a synchronizing signal interval of 4 symbols and a data interval of 828 symbols. The synchronizing signal interval has two levels of '−1' and '+1', and the data interval has 8 levels.

A background art device for detecting a synchronizing signal from a VSB transmission signal, which is a digital television broadcasting signal, will be explained with reference to the attached drawings. FIG. 1 illustrates a waveform showing a general configuration of a data, FIG. 2 illustrates a block diagram showing a background art device for detecting a synchronizing signal from a VSB transmission signal, and FIGS. 3a to 3c illustrates a waveform showing an example of synchronizing signal detection by means of the device in FIG. 2.

Referring to FIG. 2, the background art device for detecting a synchronizing signal from a VSB transmission signal is provided with a correlator 11 for subjecting the VSB transmission signal received as a datastream and a synchronizing signal pattern preset therein to a correlation operation, a storage 12 for storing a value from the correlator 11, an adder 13 for adding a stored value in the storage 12 and the value from the correlator 11, a limiter 14 for limiting a value from the adder 13 not to exceed a certain plus level, and a confidence counter 15 for detecting a signal exceeding the certain plus level as a synchronizing signal and removing a synchronizing signal misdetected, momentarily.

The operation of the background art device for detecting a synchronizing signal having the aforementioned system will be explained.

Upon reception of a bitstream of VSB transmission signal, the correlator 11 shifts, and subjects the VSB transmission signal by one symbol unit to a correlation operation with a synchronizing signal pattern preset therein, and provides results of the operation in sequence. In the correlation operation in which the synchronizing signal pattern of "+1, −1, −1, +1" is multiplied to values of the shifted data opposite to one another respectively and resultants of the multiplications are added together, when the present shifted data is the synchronizing signal pattern, the synchronizing signal preset therein and the shifted synchronizing signal pattern are subjected to a correlation operation, to produce 4 which is the maximum. That is, if the synchronizing signal pattern is "+1, −1, −1, +1", because the shifted synchronizing pattern will also be "+1, −1, −1, +1" identical to the synchronizing signal pattern, the correlation operation becomes to produce the maximum value of 4. In the data shifting and subjecting to a correlation operation, a result of correlation operation of an interval in which the preset synchronizing signal pattern meets the synchronizing signal interval in a bitstream produces a signal of which level is higher than a result of correlation operation of an interval in which a data interval meets the preset synchronizing signal pattern. Then, as shown in FIG. 1, the storage 12 is provided with 832 memories considering that the synchronizing signal is repeated at every 832 symbols. Values from the correlator 11 are stored in the respective memories in the storage 12 in sequence. The adder 13 adds a stored value in the storage 12 and a value from the correlator 11, to update the stored value in the storage 12. When the stored value in the storage 12 is kept updated by the addition of the values from the correlator 11 of the adder 13, the stored value falling on the synchronizing signal interval is kept increasing while the same falling on intervals other than the synchronizing signal interval approaches to '0' because data intervals other than the synchronizing interval have random patterns, that is, because positive (+0 values and negative (−) values are added in the adder 13, updating the stored value of the storage 12. However, upon repetition of this operation, peak values shown in FIG. 3a increase continuously to diverge at the end, causing malfunction of synchronizing signal detecting circuit. Accordingly, the limiter 14 is provided for limiting a sum of the value from the correlator 11 and the value from the storage 12 produced from the adder 13 to a certain plus level. Then, the confidence counter 15 detects a position having a value over a certain level from the values of the limiter 14 as a position of the synchronizing signal and conducts confidence counting for reducing mistakes in the detection caused by a momentary great noise, to obtain exact positions of the synchronizing signals as shown in FIG. 3a, finally. In the meantime, if an great external noise is occurred at a position of the bitstream a distance far from a position of the synchronizing signal due to ghost and the like during data reception, in principle, the noise shown in FIG. 3b has a level lower than a detected synchronizing signal, the noise does not affect the synchronizing signal detection, significantly.

However, as shown in FIG. 3c, the synchronizing signal is limited to a certain level by the limiter 14 in the background art, distinguishing the synchronizing signal from the noise signal is not practicable. Therefore, because of the limiting operation for preventing divergence of a provided value, the background art device for detecting a synchronizing signal from a VSB transmission signal has a problem in that a wrong synchronizing signal may be detected due to the limiting level at an occurrence of noise over a certain level.

SUMMARY OF THE INVENTION

Accordingly, the present invention is directed to a device and a method for detecting a synchronizing signal from a digital T.V. signal that substantially obviates one or more of the problems due to limitations and disadvantages of the related art.

An object of the present invention is to provide a device and a method for detecting a synchronizing signal from a digital T.V. signal, which can prevent malfunction due to an external momentary noise.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a plurality of memories arranged to match symbols in each datastream of a received digital T.V. signal, in which memories the same initial values are stored. On the other hand, a symbol pattern identical to a synchronizing signal contained in the digital T.V. signal is stored in a comparator in advance, which comparator compares bits of each of the received datastreams to the symbol pattern stored in advance by a symbol unit in sequence and provides signals of zero value if identical as results of the comparisons and fixed values with a minus sign if not identical. An adder updates the initial value by adding the signal of zero value or a fixed value with a minus sign from the comparator as the result of the comparison to the initial value in the corresponding memory. A synchronizing signal detector compares each of the updated initial values to a reference value, to provide the updated initial value as a synchronizing signal when the updated initial value is greater than the reference value. In conclusion, an original initial value is a basis for setting the reference value, being a maximum value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
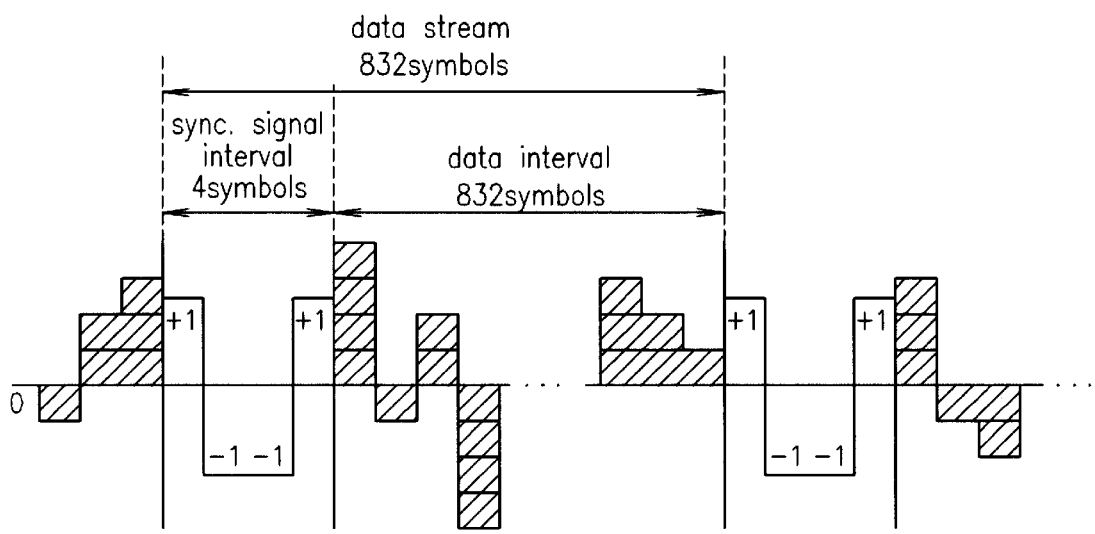
FIG. 1 illustrates a diagram showing a configuration of a general VSB transmission data.
Figure 2:
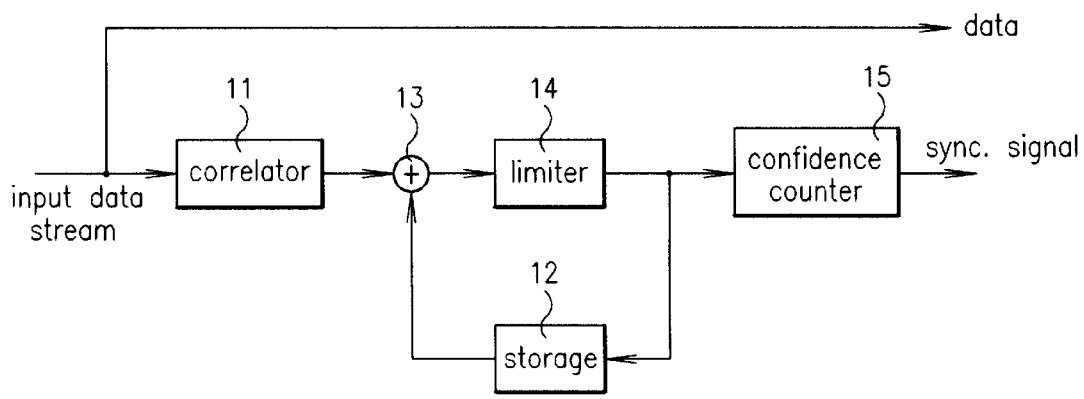
FIG. 2 illustrates a block diagram showing a background art device for detecting a synchronizing signal from a VSB transmission signal.
Figure 3A:
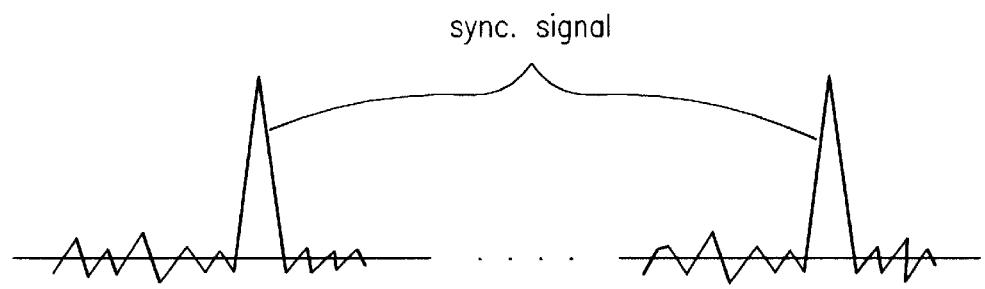
FIGS. 3a to 3c illustrates a waveform showing an example of synchronizing signal detection by means of the device in FIG. 2.
Figure 3B:
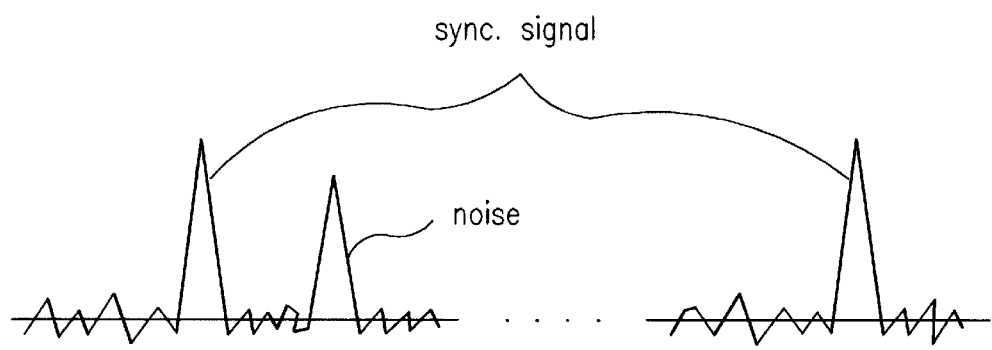
Figure 3C:
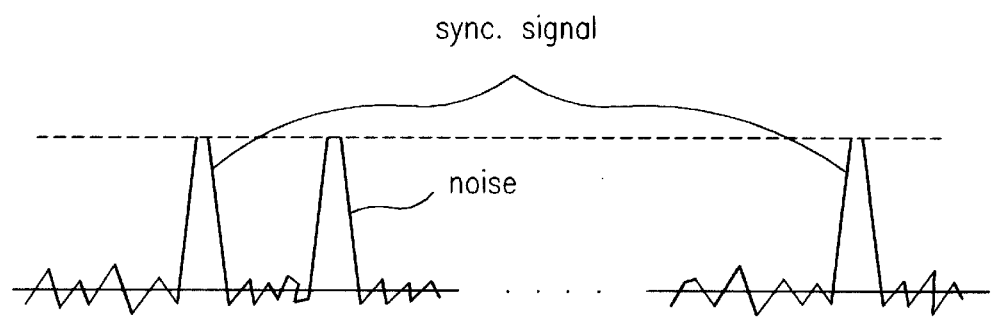
Figure 4:
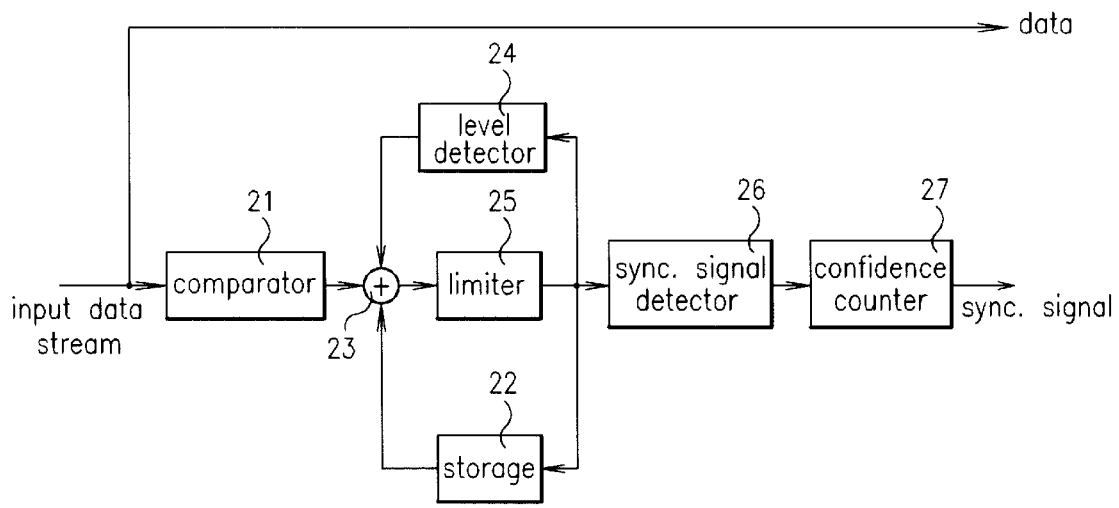
FIG. 4 illustrates a block diagram showing a device for detecting a synchronizing signal from a VSB transmission signal in accordance with a first preferred embodiment of the present invention.
Figure 5:
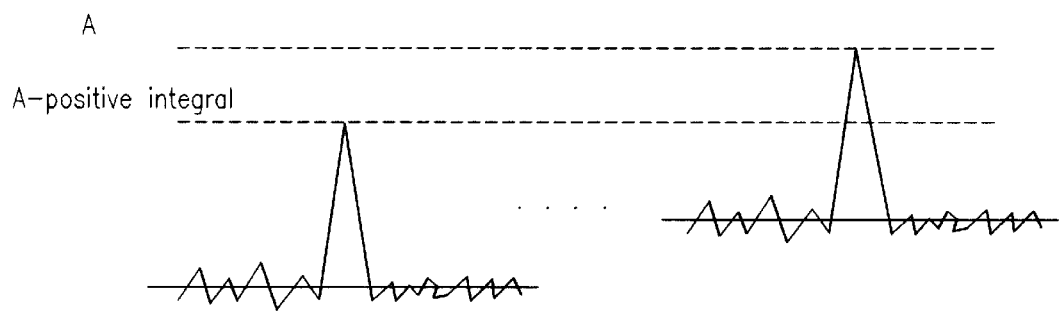
FIG. 5 illustrates a waveform for explaining a method in which the device in FIG. 4 maintains an initial value irrespective of a momentary noise.
Figure 6:
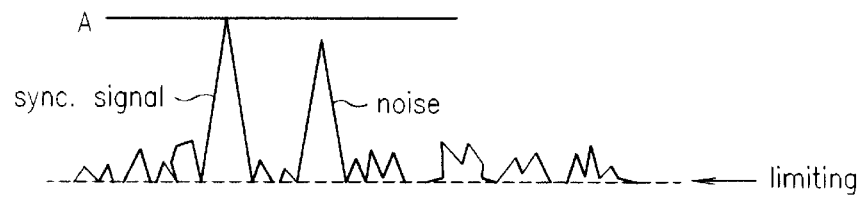
FIG. 6 illustrates a waveform for explaining an example of a synchronizing signal detection by the device in FIG. 4; and, FIG. 7 illustrates a block diagram showing a device for detecting a synchronizing signal from a VSB transmission signal in accordance with a second preferred embodiment of the present invention.

Reference will now be made in detail to the preferred embodiments of the present invention, examples of which are illustrated in the accompanying drawings. FIG. 4 illustrates a block diagram showing a device for detecting a synchronizing signal from a VSB transmission signal in accordance with a first preferred embodiment of the present invention, FIG. 5 illustrates a waveform for use in explaining a method in which the segment delay memory 34 in FIG. 4 as a storage maintains an initial value irrespective of a momentary noise, and FIG. 6 illustrates a waveform for explaining an example of a synchronizing signal detection by the device in FIG. 4.

Referring to FIG. 4, the device for detecting a synchronizing signal includes a comparator 21, a storage 22, an adder 23, a level detector 24, a limiter 25 and a synchronizing signal detector 26. The storage 22 has 832 memories each in storage of an initial value "A". The storage 22 may be provided with a plurality of segment delays and segment delay memories each having a window for opening the segment delays one by one. That is, each of the memories can be the segment delay. The segment delays are one by one matched with 832 symbols of each datastream of a VSB transmission signal. The comparator 21 is in storage of a symbol pattern identical to an actual synchronizing signal symbol pattern in an HDTV signal, of which pattern being of four symbols of "+, –, –, +". Accordingly, the comparator 21 is a synchronizing symbol pattern matcher which compares the synchronizing signal symbol pattern of a received datastream and the synchronizing signal symbol pattern already stored therein. Each bitstream has 828 data symbols other than the four symbols of the synchronizing signal.

Upon reception of each of the bitstreams of the VSB transmission signal, the comparator 21 compares the bitstream with the synchronizing signal stored already therein by a symbol unit in succession, to provide "0" if they are in agreement, and "–1" if they are not. Then, the adder 23 adds values from the comparator 21 to each of the initial values "A" in each of the memories in sequence, to update the initial values in the memories. And, the level detector 24 provides "0" to the adder 23 if at least one of the updated initial values stored in the 832 memories representing one bitstream maintains an original initial value "A" during reception of the next 832 symbols in the next bitstream, and provides "1" to the adder 23, if not. The comparator 21 provides, as explained, either "0" or "1" when the symbol patterns are only compared, when the correlator is used as explained in the background art, the values may be, not "1", but positive integers greater than "1". After the pass of the 832 symbols, the 832 memories in the storage 22 have either "A" or "A–1" depending on the values from the comparator 21 and the adder 23. Because position or positions of the memory or memories having the original initial value "A" are the same with the positions of the symbol pattern of actual synchronizing signals already stored, it is highly possible that the signal is a synchronizing signal. The above operation is repeated for successive bitstreams. Accordingly, because the symbols will be in agreement with the symbols already stored in the comparator 21 continuously within the synchronizing signal intervals in the datastream intervals, a corresponding memory can maintain the original value "A" while memories other than the above become to have values kept decreasing, like "A–1", "A–2", - - - , "A–n" as symbols in intervals other than the above will have values scarcely in agreement to each other.

In the meantime, when a momentary external noise is received during reception of each data stream, there can be a case when no memory of the memories in the storage 22 has the initial value "A". That is, due to a momentary change of any one of the symbols in the synchronizing signal interval, the symbols in the synchronizing signal interval are not in agreement with the synchronizing signal pattern stored in the comparator already, though the synchronizing signal interval exists in each datastream, actually. In this instance, a certain memory in synchronizing signal positions of the memories in the storage 22 is caused to have a decreased value "A−1" due to the momentary external noise while the memory maintains the initial value "A" until the occurrence of the momentary external noise. Therefore, as shown in FIG. 5, the level detector 24 detects no existence of the initial value "A" for the present 832 symbols and provides "1" to the adder 23 for the next 832 symbols so that the memory with the decreased initial value "A−1" due to the momentary external noise can maintain the original initial value "A". That is, the value of "1" which is decreased due to the momentary external noise is compensated so that the memories at the synchronizing positions can maintain the original initial values of "A". As explained, the compensated value "1" can be a positive integer greater than "1" if the correlator is used as the comparator instead of the pattern matcher. Since the momentary external noise cease to exist sooner, upon reception of the next datastream, the comparator 21 becomes to provide "0" in a synchronizing signal interval in agreement with the synchronizing signal pattern stored already therein, and memories corresponding to the interval becomes to maintain the original initial values "A".

On the other hand, values in the data interval of the values from the adder 23, which are additions of the updated initial values stored in the memories in the storage 22 and the values from the comparator 21, are kept decreasing in a negative direction like "A−1", "A−2", - - - , "A−n". If the values from the comparator 21 kept decreased in the negative direction exceed a certain level, it can give influence to the detection of a synchronizing signal from a signal of the adder 23. Accordingly, the limiter 25 is used for limiting the signal of the adder 23 overflowing a certain level in the negative direction.

The synchronizing signal detector 26 detects a value greater than the decreased initial value "A−1" from values from the adder 23 which are additions of the updated initial values stored in the memories in the storage 22 and values from the comparator 21, that is provided as the synchronizing signal in the HDTV signal. A position of a corresponding memory in the storage 22 at the time is detected as a position of the synchronizing signal. As explained, the "initial value −1" as a reference value for detecting a synchronizing signal may be "initial value—a positive integer" if the correlator is used as the comparator 21 in place of the pattern matcher. In other words, considering that the decreased initial value "A−1" is a level of the synchronizing signal that could not maintain the original initial value "A", positions of the memories with values equal or greater than the decreased initial value "A−1", i.e., "A−1" and "A" are detected as positions of the synchronizing signals. The confidence counter 27 grasps regular intervals of the synchronizing signal provided from the synchronizing signal detector 26 and presents, not a momentary synchronizing signal out of the regular intervals, determining that this is an error, but the rest of the synchronizing signal with a regular interval only, finally.

As has been explained, in the present invention, the original initial value "A" is always the maximum of the signals from the adder 23, and the synchronizing signal is detected by detecting the maximum value. Accordingly, as shown in FIG. 6, even if an external noise caused by ghost and the like is received, the noise is made smaller to permit detection of the synchronizing signal irrespective of the ghost.

SECOND PREFERRED EMBODIMENT

Figure 7:
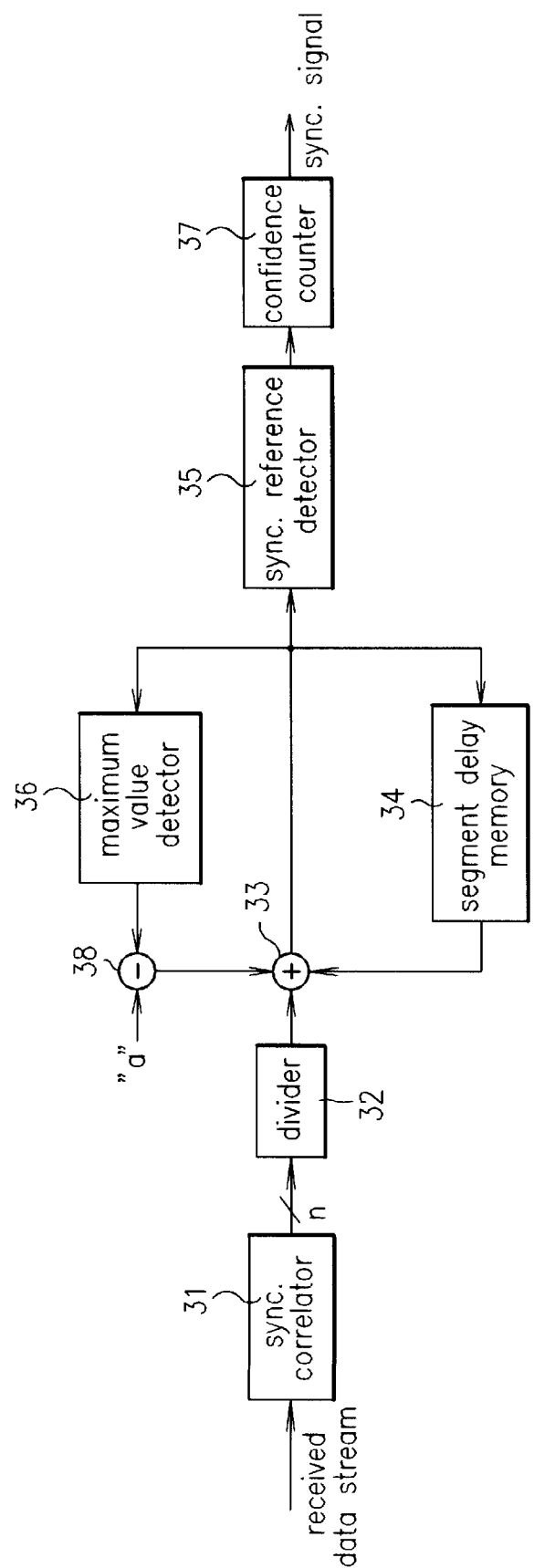

Referring to FIG. 7, a synchronization correlator 31 subjects a data bitstream of a digital television signal received therein to a correlation operation with a synchronizing pattern "+5, −5, −5, +5" stored therein. The resultant of the correlation operation is the greatest when the received datastream is identical to the synchronizing pattern "+5, −5, −5, +5". Therefore, the maximum value can be calculated in advance. After subjecting the received data bitstream to a correlation operation with a synchronizing pattern "+5, −5, −5, +5", the synchronization correlator 31 provides a value obtained by subtracting the maximum value from the resultant of the correlation operation. Therefore, when the received datastream is identical to the synchronizing pattern "+5, −5, −5, +5", "0" is provided, and when not identical, a negative value(a negative integer) as much as they are not identical is provided. That is, different from the comparator in the first embodiment, the synchronizing correlator 31 provides, not a single bit, but n bits of a positive integer. Each value from the synchronizing correlator 31 is added to an initial value "A" in each corresponding segment in a segment delay memory 34 in the adder 33, and stored therein again. A divider 32 is used for dividing a signal from the synchronizing correlator 34 at a certain ratio. The divider 32 is used for reducing a size of the segment delay memory 34. That is, as the signal from the synchronizing correlator 31 can be a great value different from the first embodiment, the segment delay memory 34 should of course have a large size, i.e., capacity, correspondingly. The use of divider allows to reduce the size of the segment delay memory 34. In the meantime, the segment delay memory 34 has 832 segment delays each with the initial value "A" already stored therein as explained before. Therefore, the signals from the adder 33 are updated, and stored in the delay segments in an order of the provision, and when datastreams are received in succession, signals from the adder 33 are updated, and stored in the segment delay memory 34 in succession. Thus, if a process is repeated in which the maximum value in the segment delay memory 34 is subtracted from the initial value "A" after the correlation operation and the signals from the adder 33 are accumulated in the segment delay memory 34, in the synchronizing interval of each datastream, "0" will be provided from the synchronizing correlator 31 to the adder 33 and the initial value "0" will be maintained in a segment delay in the segment delay memory 34 corresponding to the synchronizing interval. However, since great negative values are provided from the synchronizing correlator 31 in the data interval, corresponding segment delays in the segment delay memory 34 will have small values toward a negative direction stored therein as the accumulation proceeds. The maximum value detector 36 checks outputs of the adder 33 during 832 clocks corresponding to a datastream everytime each of the datastreams is received therein and provides a maximum value. That is, a maximum value among the values stored in the segment delay memory 34 is detected by a datastream unit. A subtractor 38 subtracts the maximum value detected by the maximum value detector from the initial value "A"

already stored in the segment delay memory 34 and provides to the adder 33 during 832 clocks of a successive datastream. Accordingly, the initial value "A" can be always maintained in the synchronizing signal interval of the segment delay memory 34. When there is noise in the channel, a wrong synchronizing pattern might be received even from the synchronizing signal interval of the datastream at times due to the noise. In this instance, the maximum value detector 36 and the subtractor 38 calculate new outputs by a datastream unit, i.e., a 832 clock unit. After the checking outputs of the adder 33 during 832 clocks corresponding to one datastream and detecting a maximum value of the segment delay memory 34, a value, obtained by subtracting the maximum value decreased momentarily due to noise and the like from the already stored initial value "A", is provided to the adder 33 during the 832 clocks corresponding to the next bitstream, increasing the value stored in the segment delay memory 34 as much. At the end, the segment delay memory 34 is caused to maintain a loop as if the initial value "A" is always stored in the synchronizing signal position. Because the maximum value among the accumulated values in the loop always maintains the initial value "A" or a value slightly smaller than the initial value "A" as shown in FIG. 5 while a value affected by ghost is caused to have a value always smaller than the above value as shown in FIG. 6, a synchronization reference detector 35 can always detect an exact position of the synchronizing signal irrespective of noise like ghost. As explained in the first embodiment, the confidence counter 37 checks the synchronizing signal interval in every datastream continuously and provides synchronizing signals at regular intervals.

The device and method for detecting a synchronizing signal from a VSB transmission signal of the present invention has the following advantages.

First, in order to prevent divergence of a detected synchronizing signal, an initial value is detected on a basis of an already stored maximum value instead of the method limiting a plus level value over a certain level. Accordingly, erroneous detection of the synchronizing signal caused by the limiting of plus side level can be prevented fundamentally.

Second, the use of a small sized comparator which only compares symbols of each data in place of the background art correlator allows a bulk of the device.

It will be apparent to those skilled in the art that various modifications and variations can be made in device and method for detecting a synchronizing signal from a digital T. V. signal of the present invention without departing from the spirit or scope of the invention. Thus, it is intended that the present invention cover the modifications and variations of this invention provided they come within the scope of the appended claims and their equivalents.

What is claimed is:

1. A device for detecting a synchronizing signal for a digital television receiver, comprising:
   a pattern matcher for comparing a symbol pattern of a synchronizing signal stored therein to symbols of a digital television signal received by a datastream unit having a plurality of the symbols in sequence, and providing zero's if identical and "−1's" if not identical;
   memories each having the same initial value arranged to match in one to one fashion to the symbols;
   an adder for updating the initial values in the memories continuously by means of a method in which signals provided in sequence from the pattern matcher as many as a number of symbols in the datastream to the initial values in the memories matched to the symbols in sequence and storing added values in the memories matched to the symbols;
   a level detector for adding "1" to each of the updated values during the plurality of symbols representing a next datastream when any of the updated value in the memories do not maintain the original initial value during the plurality of symbols representing a datastream; and,
   a synchronization reference detector for detecting a time point as a synchronizing signal position, the time point being when each of the updated values stored in the memories is equal or greater than "an initial value −1".

2. A device as claimed in claim 1, wherein the symbol pattern of the synchronizing signal is identical to an actual symbol pattern of the synchronizing signal contained in the digital T.V. signal.

3. A device as claimed in claim 1, further comprising a limiter for limiting provision of a minus signal over a certain level of signals from the adder.

4. A device as claimed in claim 1, further comprising a confidence counter for checking intervals of the synchronizing signals from the synchronizing signal detector for only providing synchronizing signals at regular intervals.

5. A device as claimed in claim 1, wherein each of the datastreams includes 4 symbols falling on a synchronizing signal pattern and 828 data symbols.

6. A device as claimed in claim 1, wherein the 4 symbols falling on the synchronizing signal pattern are "+, −, −, +".

7. A device as claimed in claim 1, wherein the digital T.V. signal is a VSB signal.

8. A device as claimed in claim 1, wherein the plurality of memories includes one segment delay memory having a plurality of segment delays.

9. A device for detecting a synchronizing signal from a digital T.V. signal, comprising:
   a synchronizing correlator for subjecting a symbol pattern of a synchronizing signal stored therein and symbols of a digital television signal received by a datastream unit having a plurality of the symbols to correlation operations in sequence and providing "1's" if identical as results of the correlation operations and a minus integer if not identical;
   memories each having the same initial value arranged to match in one to one fashion to the symbols;
   an adder for updating the initial values in the memories continuously by means of a method in which signals provided in sequence from the synchronizing correlator as many as a number of symbols in the datastream to the initial values in the memories matched to the symbols in sequence and storing added values in the memories matched to the symbols;
   a maximum value detector for detecting a maximum value from the updated values during the plurality of symbols representing a datastream adding values obtained by subtracting the maximum value from the initial value to each of the updated values while the plurality of symbols representing a next datastream are processed; and,
   a synchronization reference detector for detecting a time point as a synchronizing signal position, the time point being when each of the updated values stored in the memories is "an initial value—a positive integer".

10. A device as claimed in claim 9, wherein the symbol pattern of the synchronizing signals is identical to an actual symbol pattern of the synchronizing signal contained in the digital T.V. signal.

11. A device as claimed in claim 9, further comprising a confidence counter for checking intervals of the synchronizing signals from the synchronizing signal detector for only providing synchronizing signals at regular intervals.

12. A device as claimed in claim 9, wherein the bitstream includes 4 symbols falling on a synchronizing signal symbol pattern and 828 data symbols.

13. A device as claimed in claim 12, wherein the 4 symbols falling on the synchronizing signal symbol pattern are "+5, −5, −5, +5".

14. A device as claimed in claim 9, wherein the digital T.V. signal is a VSB transmission signal.

15. A device as claimed in claim 9, wherein the plurality of memories includes a segment delay memory having a plurality of segment delays.

16. A method for detecting a synchronizing signal for a digital T.V. receiver having a plurality of memories, comprising the steps of:
    (a) storing a same initial value in each of the plurality of memories;
    (b) providing a digital T.V. signal to the digital T.V. receiver by a datastream unit having symbols one to one matched to the memories;
    (c) first updating the initial value in each of the memories by repeating a process by the datastream unit in sequence, in which symbols in the datastream are compared to a preset symbol pattern of the synchronizing signal in sequence, and the initial value in a corresponding memory is maintained as it was if in agreement to each other and the initial value in a corresponding memory is subtracted of "1" if not in agreement to each other;
    (d) second updating the initial value stored in each memory by adding "1" to all the updated initial values representing a next datastream when any one of the updated initial values do not maintain original values after proceeding the step (c) for each datastream; and,
    (e) detecting the second updated signal as the synchronizing signal when the second updated initial value is either one of "an initial value—1".

17. A method as claimed in claim 16, further comprising the step of removing minus signals lower than a certain minus level among the second updated initial values before the step of comparing the second updated initial values to the preset reference value.

18. A method as claimed in claim 16, further comprising the steps of,
    checking the detected synchronizing signal of being a signal at a regular interval, and
    finally providing the detected synchronizing signal only when the detected synchronizing signal is a signal at a regular interval.

19. A method as claimed in claim 16, wherein the symbol pattern of the synchronizing signal are preset to be identical to the symbol pattern of an actual synchronizing signal contained in the digital T.V. signal.

20. A method as claimed in claim 16, wherein the symbol pattern of the synchronizing signal includes more than one symbols.

21. A method as claimed in claim 16, wherein the symbol pattern of the synchronizing signal includes four symbols of +, −, −, +.

22. A method as claimed in claim 16, wherein the digital T.V. signal is a VSB transmission signal.

23. A method as claimed in claim 16, wherein the plurality of memories includes a segment delay memory having a plurality of segment delays.

24. A method for detecting a synchronizing signal for a digital T.V. receiver having a plurality of memories, the method comprising the steps of:
    (a) storing a same initial value in each of the plurality of memories;
    (b) providing a digital T.V. signal to the digital T.V. receiver by a datastream unit having symbols one to one matched to the memories;
    (c) updating the initial value in each of the memories by repeating a process by the datastream unit, in which symbols in the datastream are compared to a preset symbol pattern of the synchronizing signal by a symbol unit, and the initial value in a corresponding memory is maintained as it was if in agreement to each other and the initial value in a corresponding memory is subtracted of a first positive integer if not in agreement to each other;
    (d) second updating the initial value stored in each memory by subtracting a maximum value of the updated initial values from the initial values and adding a resultant to the updated initial values representing a next datastream after proceeding the step (c) for each datastream; and,
    (e) detecting a time point as a position of the synchronizing signal, the time point being when the second updated initial value is "an initial value—the second positive integer" for each datastream.

25. A method as claimed in claim 24, wherein the resultant of the subtraction in the step (d) is a third positive integer.

26. A method as claimed in claim 24, wherein the step (c) includes steps of:
    dividing the first positive integer with a "k" (k is a positive integer), and
    subtracting a divided first positive integer value from the initial value in each memory.

27. A method as claimed in claim 24, further comprising the steps of:
    checking the detected synchronizing signal of being a signal at a regular interval; and,
    providing the detected synchronizing signal only when the detected synchronizing signal is a signal at a regular interval.

28. A method as claimed in claim 24, wherein the symbol pattern of the synchronizing signal are preset to be identical to the symbol pattern of an actual synchronizing signal contained in the digital T.V. signal.

29. A method as claimed in claim 24, wherein the symbol pattern of the synchronizing signal includes more than one symbols.

30. A method as claimed in claim 29, wherein the symbol pattern of the synchronizing signal includes four symbols of +5, −5, −5, +5.

31. A method as claimed in claim 24, wherein the digital T.V. signal is a VSB transmission signal.

32. A method as claimed in claim 24, wherein the plurality of memories includes a segment delay memory having a plurality of segment delays.

* * * * *